United States Patent
Sato et al.

(10) Patent No.: US 9,623,606 B2
(45) Date of Patent: Apr. 18, 2017

(54) METHOD OF MANUFACTURING THREE-DIMENSIONAL STRUCTURE AND THREE-DIMENSIONAL STRUCTURE

(71) Applicant: SEIKO EPSON CORPORATION, Tokyo (JP)

(72) Inventors: Chigusa Sato, Nagano (JP); Koki Hirata, Nagano (JP); Hiroshi Fukumoto, Nagano (JP); Shinichi Kato, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 35 days.

(21) Appl. No.: 14/747,125

(22) Filed: Jun. 23, 2015

(65) Prior Publication Data
US 2015/0375459 A1    Dec. 31, 2015

(30) Foreign Application Priority Data

Jun. 27, 2014   (JP) .................................. 2014-132355

(51) Int. Cl.
| | | |
|---|---|---|
| *B29C 67/00* | (2006.01) | |
| *B33Y 10/00* | (2015.01) | |
| *B33Y 80/00* | (2015.01) | |
| *B29K 105/00* | (2006.01) | |

(52) U.S. Cl.
CPC .......... *B29C 67/0081* (2013.01); *B33Y 10/00* (2014.12); *B33Y 80/00* (2014.12); *B29K 2105/0044* (2013.01)

(58) Field of Classification Search
None
See application file for complete search history.

(56) References Cited

U.S. PATENT DOCUMENTS

| | | |
|---|---|---|
| 3,732,107 A | 5/1973 | Faust |
| 3,857,885 A | 12/1974 | Faust |
| 4,458,006 A | 7/1984 | Donges et al. |
| 4,495,271 A | 1/1985 | Geissler et al. |
| 4,530,747 A | 7/1985 | Donges et al. |
| 4,987,053 A | 1/1991 | Gersdorf et al. |
| 5,200,299 A | 4/1993 | Steppan et al. |
| 6,132,665 A | 10/2000 | Bui et al. |
| 6,799,959 B1 | 10/2004 | Tochimoto et al. |

(Continued)

FOREIGN PATENT DOCUMENTS

| | | |
|---|---|---|
| JP | 46-027926 A | 8/1971 |
| JP | 48-041708 A | 12/1973 |

(Continued)

*Primary Examiner* — Mary F Theisen
(74) *Attorney, Agent, or Firm* — Global IP Counselors, LLP

(57) ABSTRACT

The method of manufacturing a three-dimensional structure, in which the three-dimensional structure is manufactured by laminating a layer, includes the steps of: forming the layer using a three-dimension formation composition containing a particle and a light stabilizer A; and discharging a binding solution containing a binder and a light stabilizer B to the layer, in which, when the content ratio of the light stabilizer A contained in the three-dimension formation composition is represented by A (mass %) and the content ratio of the light stabilizer B contained in the binding solution is represented by B, a relationship of $2 \leq A/B \leq 4$ is satisfied.

10 Claims, 3 Drawing Sheets

(56) References Cited

U.S. PATENT DOCUMENTS

2009/0292040 A1    11/2009   Sarmah et al.
2015/0014881 A1*    1/2015   Elsey ................ B29C 67/0059
                                                                              264/219

FOREIGN PATENT DOCUMENTS

| | | |
|---|---|---|
| JP | 51-047334 B | 12/1976 |
| JP | 54-021726 B | 8/1979 |
| JP | 57-196231 A | 12/1982 |
| JP | 59-005240 A | 1/1984 |
| JP | 59-005241 A | 1/1984 |
| JP | 01-165613 A | 6/1989 |
| JP | 02-226149 A | 9/1990 |
| JP | 2000-309703 A | 11/2000 |
| JP | 2001-150556 A | 6/2001 |
| JP | 2010-520098 A | 6/2010 |
| JP | 2011-245712 A | 12/2011 |

* cited by examiner

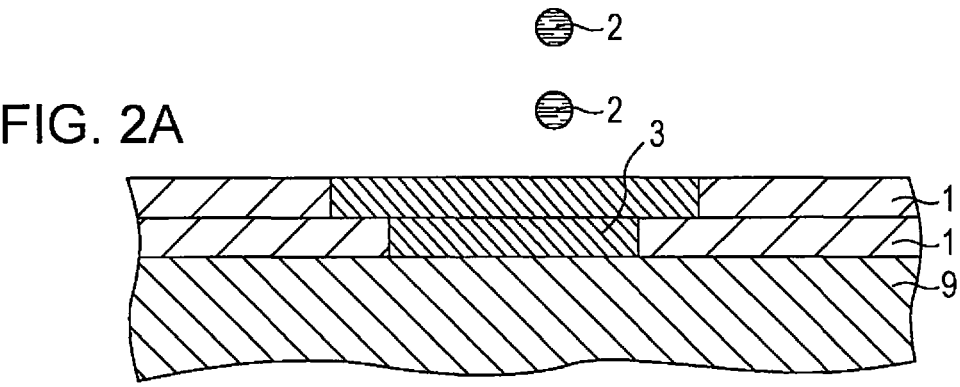
FIG. 2A
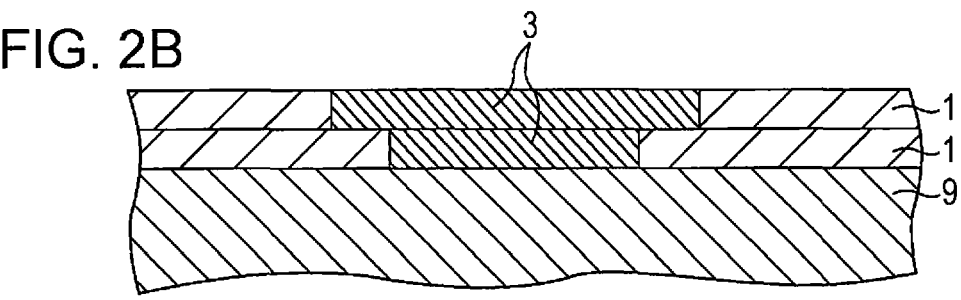
FIG. 2B
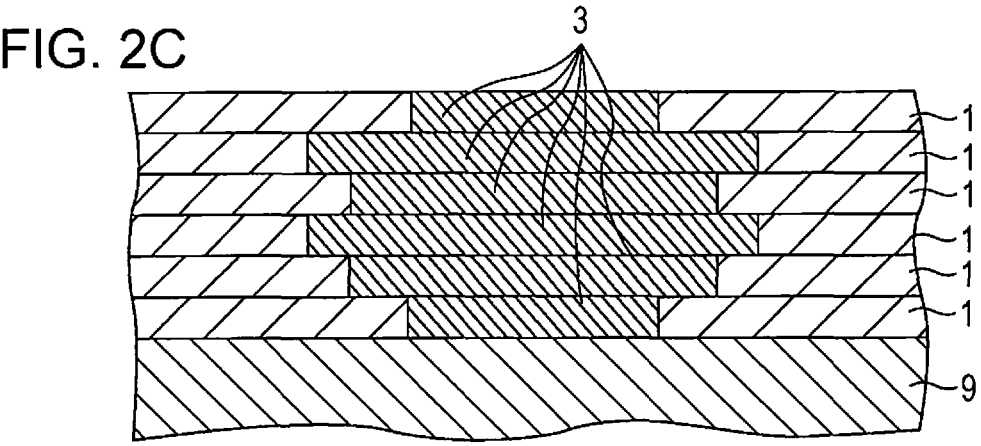
FIG. 2C
FIG. 2D
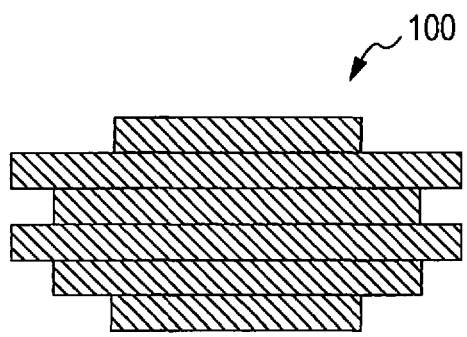

METHOD OF MANUFACTURING THREE-DIMENSIONAL STRUCTURE AND THREE-DIMENSIONAL STRUCTURE

BACKGROUND

1. Technical Field

The present invention relates to a method of manufacturing a three-dimensional structure, and a three-dimensional structure.

2. Related Art

A technology of forming a three-dimensional object while hardening powder with a binding solution is known (for example, refer to JP-A-2001-150556). In this technology, a three-dimensional object is formed by repeating the following operations. First, powder is thinly spread in a uniform thickness to form a powder layer, and a binding solution is discharged to a desired portion of the powder layer to bind the powder particles together. As a result, in the powder layer, only the portion to which the binding solution is discharged is attached to form a thin plate-like member (hereinafter referred to as "section member"). Thereafter, a thin powder layer is further formed on this powder layer, and a binding solution is discharged to a desired portion thereof. As a result, a new section member is formed even on the portion of the newly-formed powder layer to which the binding solution is discharged. In this case, since the binding solution discharged on the powder layer penetrates the powder layer to reach the previously-formed section member, the newly-formed section member is attached to the previously-formed section member. The thin plate-like section members are laminated one by one while repeating these operations, thus forming a three-dimensional object.

In this technology of forming a three-dimensional object, when three-dimensional shape data of an object to be formed exists, it is possible to directly form a three-dimensional object by binding powder particles, and there is no need to create a mold prior to formation, so that it is possible to quickly and inexpensively form a three-dimensional object. In addition, since the three-dimensional object is formed by laminating the thin plate-like section members one by one, for example, even in the case of a complex object having a complicated internal structure, it is possible to form the three-dimensional object as an integrally-formed structure without dividing the complex object into a plurality of parts.

However, in the related art, the stability to light of a three-dimensional structure could not be made sufficiently high.

SUMMARY

An advantage of some aspects of the invention is to provide a method of manufacturing a three-dimensional structure, by which a three-dimensional structure having excellent stability to light can be efficiently manufactured, and to provide a three-dimensional structure having excellent stability to light.

The invention is realized in the following forms.

According to an aspect of the invention, there is provided a method of manufacturing a three-dimensional structure, in which the three-dimensional structure is manufactured by laminating a layer, the method including: forming the layer using a three-dimension formation composition containing a particle and a light stabilizer A; and discharging a binding solution containing a binder and a light stabilizer B to the layer, in which, when the content ratio of the light stabilizer A contained in the three-dimension formation composition is represented by A (mass %) and the content ratio of the light stabilizer B contained in the binding solution is represented by B, a relationship of $2 \leq A/B \leq 4$ is satisfied.

In this case, it is possible to efficiently manufacture a three-dimensional structure having excellent stability to light.

In the method of manufacturing a three-dimensional structure according to the aspect of the invention, it is preferable that the content ratio of the light stabilizer A in the three-dimension formation composition is 0.03 mass % to 1.0 mass %.

In this case, it is possible to further improve the stability to light of a three-dimensional structure to be finally obtained.

In the method of manufacturing a three-dimensional structure according to the aspect of the invention, it is preferable that the content ratio of the light stabilizer B in the binding solution is 0.01 mass % to 0.35 mass %.

In this case, it is possible to further improve the stability to light of a three-dimensional structure to be finally obtained.

In the method of manufacturing a three-dimensional structure according to the aspect of the invention, it is preferable that each of the light stabilizer A and the light stabilizer B contains at least one of a hindered amine-based stabilizer and a triazine-based stabilizer.

In this case, it is possible to further improve the stability to light of a three-dimensional structure to be finally obtained.

In the method of manufacturing a three-dimensional structure according to the aspect of the invention, it is preferable that the three-dimension formation composition contains a water-soluble resin.

In this case, particles are bound (temporarily fixed) together, and thus it is possible to effectively prevent the unintended scattering of the particles.

According to another aspect of the invention, there is provided a three-dimensional structure, which is manufactured by the method of manufacturing a three-dimensional structure.

In this case, it is possible to provide a three-dimensional structure having excellent stability to light.

BRIEF DESCRIPTION OF THE DRAWINGS

The invention will be described with reference to the accompanying drawings, wherein like numbers reference like elements.

FIGS. 2A to 2D are schematic views showing each process of a preferred embodiment in a method of manufacturing a three-dimensional structure of the invention.

DESCRIPTION OF EXEMPLARY EMBODIMENTS

Figure 1A:
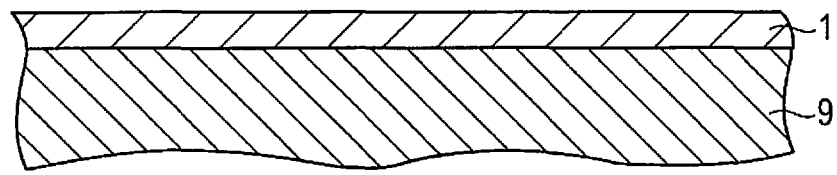
FIGS. 1A to 1D are schematic views showing each process of a preferred embodiment in a method of manufacturing a three-dimensional structure of the invention.
Figure 1A:
Figure 1B:
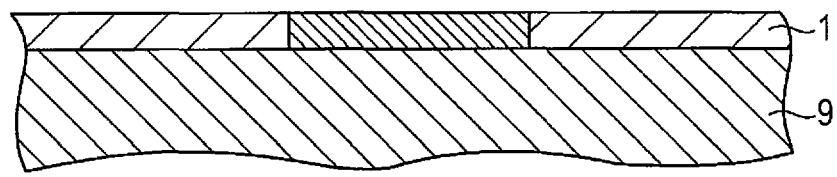
Figure 1B:
Figure 1C:
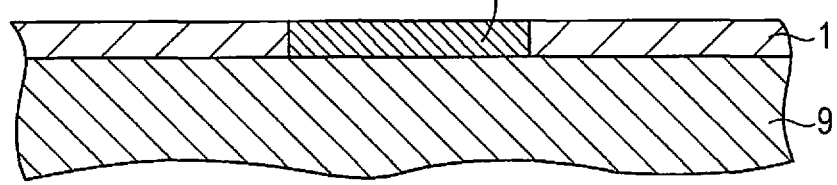
Figure 1C:
Figure 1D:
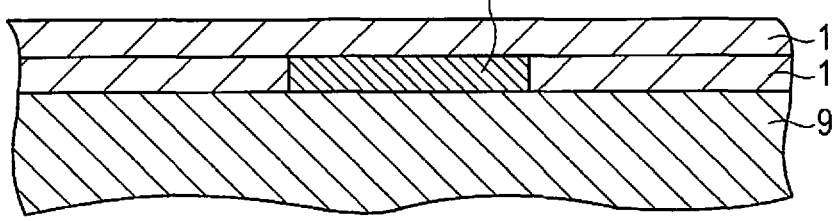

Hereinafter, preferred embodiments of the invention will be described in detail with reference to the accompanying drawings.

1. Method of Manufacturing Three-Dimensional Structure

First, a method of manufacturing a three-dimensional structure according to the invention will be described.

FIGS. 1A to 2D and FIGS. 2A to 2D are schematic views showing each process of a preferred embodiment in the method of manufacturing a three-dimensional structure of the invention.

As shown in FIGS. 1A to 2D and FIGS. 2A to 2D, the method of manufacturing a three-dimensional structure according to the present embodiment includes: layer forming processes (1A and 1D) of forming layers 1 using a three-dimension formation composition 1' containing particles and a light stabilizer A; discharge processes (1B and 2A) of applying a binding solution 2 containing a binder and a light stabilizer B to each of the layers 1 by an ink jet method; and curing processes (1C and 2B) of curing the binder contained in the binding solution 2 applied to each of the layers 1. Here, these processes are sequentially repeated. The method of manufacturing a three-dimensional structure further includes an unbound particle removal process (2D) of removing particles, which are not bound by the binder, from the particles constituting each of the layers 1.

The method of manufacturing a three-dimensional structure according to the invention is characterized in that, when the content ratio of the light stabilizer A contained in the three-dimension formation composition is represented by A (mass %) and the content ratio of the light stabilizer B contained in the binding solution is represented by B, a relationship of $2 \leq A/B \leq 4$ is satisfied. In this case, it is possible to improve the stability to light of a three-dimensional structure to be finally obtained. Further, it is possible to improve the discharging performance of the binding solution and to increase the production efficiency and shape accuracy of the three-dimensional structure.

Hereinafter, each of the processes will be described in detail.

Layer Forming Process

First, a layer 1 is formed on a support (stage) 9 using a three-dimension formation composition 1' (1A).

The support 9 has a flat surface (site on which the three-dimension formation composition 1' is applied). Thus, it is possible to easily and reliably form a layer 1 having high uniformity of thickness.

It is preferable that the support 9 is made of a high-strength material. Various kinds of metal materials, such as stainless steel and the like, are exemplified as the constituent material of the support 9.

In addition, the surface (site on which the three-dimension formation composition 1' is applied) of the support 9 may be surface-treated. Thus, it is possible to effectively prevent the constituent material of the three-dimension formation composition 1' or the constituent material of the binding solution 2 from adhering to the support 9, and it is also possible to realize the stable production of a three-dimensional structure 100 over a long period of time by making the durability of the support 9 particularly excellent. As the material used in the surface treatment of the support 9, a fluorine-based resin, such as polytetrafluoroethylene, is exemplified.

The three-dimension formation composition 1' contains a water-soluble resin in addition to a plurality of particles and a light stabilizer A.

By allowing the three-dimension formation composition 1' to contain the water-soluble resin, the particles are bound (temporarily fixed) together to effectively prevent the involuntary scattering of the particles. Thus, it is possible to improve the safety of workers or the dimensional accuracy of the three-dimensional structure 100 which is manufactured.

This process can be performed using a squeegee method, a screen printing method, a doctor blade method, a spin coating method, or the like.

The thickness of the layer 1 formed in this process is not particularly limited, but is preferably 10 μm to 100 μm, and more preferably 10 μm to 50 μm. Thus, the productivity of the three-dimensional structure 100 can be sufficiently increased, the occurrence of involuntary unevenness in the manufactured three-dimensional structure 100 can be more effectively prevented, and the dimensional accuracy of the three-dimensional structure 100 can be particularly increased.

Discharge Process

Thereafter, a binding solution 2 containing a binder and a light stabilizer B is discharged to the layer 1 by an ink jet method (1B).

In this process, the binding solution 2 is selectively applied only to the site corresponding to the real part (substantial site) of the three-dimensional structure 100 in the layer 1.

In this process, since the binding solution 2 is applied by an ink jet method, the binding solution 2 can be applied with good reproducibility even when the pattern of the applied binding solution 2 has a fine shape.

Further, the binding solution 2 will be described in detail later.

Curing Process

Next, the binding solution applied to the layer 1 is cured to form a cured portion 3 (1C). Thus, binding strength between the particles can be made to be particularly excellent, and, as a result, the mechanical strength of the finally obtained three-dimensional structure 100 can be made to be particularly excellent.

Although differing depending on the kind of a curing component (binder), for example, when the curing component (binder) is a thermosetting component, this process can be performed by heating, and, when the curing component (binder) is photocurable component, this process can be performed by irradiation of the corresponding light (for example, this process can be performed by irradiation of ultraviolet rays when the curing component is an ultraviolet-curable component).

The ink discharge process and the curing process may be simultaneously performed. That is, the curing reaction may sequentially proceed from the site on which the binding solution 2 is applied, before the entire pattern of the entire one layer 1 is formed.

Thereafter, a series of the processes are repeated (refer to 1D, 2A, and 2B). Thus, in each of the layers 1, the particles are bound on the site on which the binding solution 2 has been applied, and, in this state, a three-dimensional structure 100 is obtained as a laminate in which the plurality of layers 1 are laminated (refer to 2C).

In the second and subsequent ink discharge processes (refer to 1D), the binding solution 2 applied to the layer 1 is used in binding the particles constituting this layer 1, and a part of the applied binding solution 2 penetrates into the layer 1 located under this layer 1. For this reason, the binding solution 2 is used in binding the particles between adjacent layers as well as binding the particles in each of the layers 1. As a result, the finally obtained three-dimensional structure 100 becomes excellent in overall mechanical strength.

Unbound Particle Removal Process

After the aforementioned series of processes are repeated, in the particles constituting each of the layers 1, a process (2D) of removing the particles (unbound particles) not bound by the binder is performed. Thus, a three-dimensional structure 100 is obtained.

Examples of specific methods used in this process include a method of dispelling unbound particles with a brush or the like, a method of removing unbound particles by suction, a method of blowing a gas such as air, a method of imparting a liquid such as water (for example, a method of dipping the laminate obtained as described above into liquid, a method of spraying liquid, or the like), and a method of imparting vibration such as ultrasonic vibration. These methods can be used in a combination of two or more thereof. More specifically, a method of blowing a gas such as air and then applying liquid such as water and a method of imparting vibration such as ultrasonic vibration with a laminate dipped into liquid such as water are exemplified. Among these, a method of applying liquid containing water to the laminate obtained in the manner described above (particularly, a method of dipping the laminate into the liquid containing water) is preferably employed. Thus, in the particles constituting each of the layers 1, particles not bound by the binder are temporarily fixed by the water-soluble resin. However, when the liquid containing water is used, the water-soluble resin is dissolved to release the temporary fixation, and thus these unbound particles can be more easily and reliably removed from the three-dimensional structure 100. In addition, it is possible to more reliably prevent the occurrence of defects such as scratches of the three-dimensional structure 100 at the time of removing the unbound particles. Moreover, by employing such a method, the cleaning of the three-dimensional structure 100 can also be performed together with the removal of the unbound particles.

2. Three-Dimension Formation Composition

Next, the three-dimension formation composition 1' will be described in detail.

The three-dimension formation composition 1' contains a plurality of particles and a light stabilizer A.

Hereinafter, each component will be described in detail.

Particle

The three-dimension formation composition 1' contains particles.

As the constituent materials of the particles, for example, inorganic materials, organic materials, and complexes thereof are exemplified.

As the inorganic material constituting the particle, for example, various metals and metal compounds are exemplified. Examples of the metal compounds include: various metal oxides, such as silica, alumina, titanium oxide, zinc oxide, zirconium oxide, tin oxide, magnesium oxide, and potassium titanate; various metal hydroxides, such as magnesium hydroxide, aluminum hydroxide, and calcium hydroxide; various metal nitrides, such as silicon nitride, titanium nitride, and aluminum nitride; various metal carbides, such as silicon carbide and titanium carbide; various metal sulfides, such as zinc sulfide; various metal carbonates, such as calcium carbonate and magnesium carbonate; various metal sulfates, such as calcium sulfate and magnesium sulfate; various metal silicates, such as calcium silicate and magnesium silicate; various metal phosphates, such as calcium phosphate; various metal borates, such as aluminum borate and magnesium borate; and complexes thereof.

As the organic material constituting the particle, synthetic resins and natural polymers are exemplified. Specific examples of the organic material include polyethylene resins; polypropylene; polyethylene oxide; polypropylene oxide; polyethylene imine; polystyrene; polyurethane; polyurea; polyester; silicone resins; acrylic silicone resins; a polymer containing (meth)acrylic ester as a constituent monomer, such as polymethyl methacrylate; a crosspolymer (ethylene-acrylic acid copolymer resin or the like) containing (meth)acrylic ester as a constituent monomer, such as methyl methacrylate crosspolymer; polyamide resins, such as nylon 12, nylon 6 and copolymerized nylon; polyimide; carboxymethyl cellulose; gelatin; starch; chitin; and chitosan.

Among these, the particle is preferably made of an inorganic material, more preferably made of a metal oxide, and further preferably made of silica. Thus, it is possible to make the characteristics, such as mechanical strength and light resistance, of the three-dimensional structure particularly excellent. Further, due to excellent fluidity, silica is advantageous to the formation of a layer having higher thickness uniformity, and it is possible to make the productivity and dimensional accuracy of the three-dimensional structure 100 particularly excellent. Moreover, when the particle is made of silica, it is possible to more effectively prevent the scattering of light caused by the particle in the surface of the three-dimensional structure 100 to be manufactured.

As the exemplified silica, commercially available products can be suitably used. Specific examples thereof include FB-5D, FB-12D, FB3SDC, FB5SDC, and FB7SDC (all are manufactured by Denki Industrial Chemicals, Ltd.); REOLOSIL QS-09, REOLOSIL QS-10, REOLOSIL QS-102, REOLOSIL CP-102, REOLOSIL QS-20, EKUSERIKA SE-8, EKUSERIKA SE-15, EKUSERIKA UF-305, EKUSERIKA UF-310, EKUSERIKA UF-320, EKUSERIKA UF-345, and EKUSERIKA UF-725 (all are manufactured by Tokuyama Corporation); CARPLEX FPS-1, CARPLEX FPS-2, CARPLEX FPS-5, CARPLEX FPS-101, CARPLEX CS-5, CARPLEX #80, and CARPLEX #67 (all are manufactured by DSL. Japan Co., Ltd.); and NIPSIL ER, NIPSIL RS-150, NIPSIL E-150J, NIPSIL E-1030, NIPSIL E-170, NIPSIL E-200, NIPSIL E-200A, NIPSIL E-75, NIPSIL E-743, NIPSIL E-74P, NIPGEL AZ-200, NIPGEL AZ-260, and NIPGEL AZ-360 (all are manufactured by Tosoh Silica Corporation).

The average particle diameter of the particles is not particularly limited, but is preferably 1 μm to 25 μm, and more preferably 1 μm to 10 μm. Thus, it is possible to make the mechanical strength of the three-dimensional structure 100 particularly excellent, it is possible to more effectively prevent the occurrence of involuntary unevenness in the manufactured three-dimensional structure 100, and it is possible to make the dimensional accuracy of the three-dimensional structure 100 particularly excellent. Further, when the fluidity of three-dimensional formation powder or a three-dimension formation composition containing the three-dimension formation powder is made particularly excellent, it is possible to make the productivity of the three-dimensional structure 100 particularly excellent. In the invention, the average particle diameter refers to a volume average particle diameter, and can be obtained by measuring a dispersion liquid, which is prepared by adding a sample to methanol and dispersing the sample in methanol for 3 minutes using an ultrasonic disperser, using an aperture of 50 μm in a particle size distribution measuring instrument (TA-II, manufactured by Coulter Electronics Inc.) using a coulter counter method.

The $D_{max}$ of the particle is preferably 3 μm to 40 μm, and more preferably 5 μm to 30 μm. Thus, it is possible to make the mechanical strength of the three-dimensional structure 100 particularly excellent, it is possible to more effectively prevent the occurrence of involuntary unevenness in the manufactured three-dimensional structure 100, and it is possible to make the dimensional accuracy of the three-dimensional structure 100 particularly excellent. Further, when the fluidity of the three-dimension formation composition is made particularly excellent, it is possible to make the productivity of the three-dimensional structure 100 particularly excellent. Moreover, it is possible to more effectively prevent the scattering of light caused by the particles in the surface of the manufactured three-dimensional structure 100.

The particle may have any shape, but, preferably, has a spherical shape. Thus, when the fluidity of the three-dimension formation composition is made particularly excellent, it is possible to make the productivity of the three-dimensional structure 100 particularly excellent. Further, it is possible to more effectively prevent the occurrence of involuntary unevenness in the manufactured three-dimensional structure 100, and it is possible to make the dimensional accuracy of the three-dimensional structure 100 particularly excellent. Moreover, it is possible to more effectively prevent the scattering of light caused by the particles in the surface of the manufactured three-dimensional structure 100.

The content ratio of particles in the three-dimension formation composition 1' is preferably 5 mass % to 80 mass %, and more preferably 10 mass % to 70 mass %. Thus, the fluidity of the three-dimension formation composition 1' can be made sufficiently excellent, and the mechanical strength of the finally obtained three-dimensional structure 100 can be made particularly excellent.

Light Stabilizer A

The three-dimension formation composition 1' contains a light stabilizer A.

Examples of a light stabilizer include a radical chain initiation inhibitor, a radical scavenger, and a peroxide decomposer.

Examples of the radical chain initiation inhibitor include hydrazide-based and amide-based heavy metal deactivators, and benzotriazole-based, benzophenone-based and triazine-based ultraviolet absorbers.

Examples of the radical scavenger include a hindered amine-based stabilizer and a phenol-based antioxidant.

Examples of the peroxide decomposer include a phosphorus-based antioxidant and a sulfur-based antioxidant.

Among the above-mentioned light stabilizers, it preferable that the light stabilizer A contains at least one of a hindered amine-based stabilizer and a triazine-based stabilizer, and it is more preferable that the light stabilizer A contains both a hindered amine-based stabilizer and a triazine-based stabilizer. Thus, it is possible to further improve the stability to light of the finally obtained three-dimensional structure 100.

As the light stabilizer, commercially available products thereof can be preferably used.

Specific examples of commercially available hindered amine-based stabilizers include LA7RD (manufactured by ADEKA Corporation), TINUVIN 123 (manufactured by BASF), and TINUVIN 152 (manufactured by BASF).

Specific examples of commercially available hindered phenol-based stabilizers include IRGANOX 1035 (manufactured by BASF Corporation), and MEHQ (manufactured by Kanto Chemical Co., Inc.).

Specific examples of commercially available hydrazide-based stabilizers include CDA-6 (manufactured by ADEKA Corporation), and CDA-10 (manufactured by ADEKA Corporation).

Specific examples of commercially available amide-based stabilizers include CDA-1 (manufactured by ADEKA Corporation), and CDA-1M (manufactured by ADEKA Corporation).

Specific examples of commercially available benzotriazole-based stabilizers include TINUVIN P (manufactured by BASF Corporation), and LA-29 (manufactured by ADEKA Corporation).

Specific examples of commercially available benzophenone-based stabilizers include 1413 (manufactured by ADEKA Corporation) and the like.

Specific examples of commercially available triazine-based stabilizers include TINUVIN 477-DW (water dispersion type) (manufactured by BASF Corporation), and TINUVIN 479 (manufactured by BASF Corporation).

The content ratio of the light stabilizer A in the three-dimension formation composition 1' is preferably 0.03 mass % to 1.0 mass %, and more preferably 0.2 mass % to 0.8 mass %. Thus, it is possible to further improve the stability to light of the finally obtained three-dimensional structure 100. In contrast, when the content ratio of the light stabilizer A is below the lower limit, it is necessary to increase the content ratio of a light stabilizer B, which is added to the binding solution in order to improve the light stability of the three-dimensional structure 100, and thus there is a case in which ejection stability of the binding solution is lowered. Meanwhile, when the content ratio of the light stabilizer A is above the upper limit, there is a case in which the color of the finally obtained three-dimensional structure 100 is affected. In addition, there is a case in which the storage stability of the three-dimension formation composition 1' is lowered.

Water-Soluble Resin

The three-dimension formation composition 1' may contain a plurality of particles and a water-soluble resin. By allowing the three-dimension formation composition 1' to contain the water-soluble resin, the particles are bound (temporarily fixed) together to effectively prevent the involuntary scattering of the particles. Thus, it is possible to improve the safety of workers or the dimensional accuracy of the manufactured three-dimensional structure 100.

In the invention, at least a part of the water-soluble resin may be soluble in water. For example, the solubility (dissolvable mass in 100 g of water) of the water-soluble resin in water at 25° C. is preferably 5 g/100 g water or more, and more preferably 10 g/100 g water or more.

Examples of the water-soluble resin include synthetic polymers, such as polyvinyl alcohol (PVA), polyvinyl pyrrolidone (PVP), sodium polyacrylate, polyacrylamide, modified polyamide, polyethylene imine, and polyethylene oxide; natural polymers, such as corn starch, mannan, pectin, agar, alginic acid, dextran, glue, and gelatin; and semi-synthetic polymers, such as carboxymethyl cellulose, hydroxyethyl cellulose, oxidized starch, and modified starch. They can be used alone or in a combination of two or more thereof.

Examples of commercially available water-soluble resin products include methyl cellulose "METOLOSE SM-15" (manufactured by Shin-Etsu Chemical Co., Ltd.), hydroxyethyl cellulose "AL-15" (manufactured by Fuji Chemical Industries Ltd.), hydroxypropyl cellulose "HPC-M" (manufactured by Nippon Soda Co., Ltd.,), carboxymethyl cellulose "CMC-30" (manufactured by Nichirin Chemical Co.), starch sodium phosphate (I) "HOSUTA 5100" (manufactured by Matsutani Chemical Industry Co., Ltd.), polyvinyl alcohol "GOUSENORU GL-5" (manufactured by Nippon Synthetic Co., Ltd.), polyvinylpyrrolidone "K-90" (manufactured by Nippon Shokubai Co., Ltd.), methyl vinyl ether/maleic anhydride copolymer "GANTREZ AN-139" (manufactured by ISP Ltd.), polyacrylamide (manufactured by Wako Pure Chemical Industries, Ltd.), modified polyamide (denatured nylon) "AQ NYLON" (manufactured by Toray Industries, Inc.), polyethylene oxide "PEO-1" (manufactured by Steel Chemical Co., Ltd.), a random copolymer of ethylene oxide and propylene oxide "ALCOX EP" (manufactured by Meisei Chemical Works, Ltd.), sodium polyacrylate (manufactured by Wako Pure Chemical Industries, Ltd.), and carboxyvinyl polymer/cross-linked acrylic water-soluble resin "AKUPEK" (manufactured by Sumitomo Seika Chemicals Co., Ltd.).

Among these, when the water-soluble resin is polyvinyl alcohol, the mechanical strength of the three-dimensional structure 100 can be made particularly excellent. Characteristics (for example, solubility in water, water resistance, and the like) of the water-soluble resin and characteristics (for example, viscosity, fixing force of particles, wettability, and the like) of the three-dimension formation composition 1' can be suitably controlled by adjusting the degree of saponification and the degree of polymerization. Therefore, it is possible to appropriately cope with the manufacture of various three-dimensional structures 100. In addition, among various water-soluble resins, polyvinyl alcohol is inexpensive, and the supply thereof is stable. Therefore, it is possible to stably manufacture the three-dimensional structure 100 while suppressing the production cost thereof.

Further, when the water-soluble resin is polyvinylpyrrolidone, the following effects are obtained. That is, since polyvinylpyrrolidone has excellent adhesiveness to various materials, such as glass, metals, and plastics, the stability of strength and shape of a portion of the layer 1, on which the binding solution is not applied, is particularly excellent, and thus it is possible to make the dimensional accuracy of the finally obtained three-dimensional structure particularly excellent. Further, since polyvinylpyrrolidone exhibits high solubility in water, among the particles constituting the layer 1, particles unbound by a binder can be easily and completely removed during the unbound particle removal process (after formation). Moreover, since polyvinylpyrrolidone has an antistatic function, when non-pasted powder is used as the three-dimension formation composition in the layer forming process, it is possible to effectively prevent the scattering of this powder.

In the three-dimension formation composition 1', preferably, the water-soluble resin, at least in the layer forming process, is present in a liquid state (for example, a dissolved state, a molten state, or the like). Thus, it is possible to easily and reliably make the thickness uniformity of the layer 1 formed using the three-dimension formation composition 1' higher.

The content ratio of the water-soluble resin in the three-dimension formation composition 1' is preferably 20 vol % or less, and more preferably 1 vol % to 5 vol %, based on the bulk volume of the particles. Thus, the aforementioned function of the water-soluble resin can be sufficiently exhibited, a space through which the binding solution 2 passes can be further widely secured, and the mechanical strength of the three-dimensional structure 100 can be made particularly excellent.

Solvent

The three-dimension formation composition 1' may contain a solvent in addition to the aforementioned water-soluble resin and particles. Thus, the fluidity of the three-dimension formation composition 1' becomes particularly excellent, and thus, the productivity of the three-dimensional structure 100 can be particularly improved.

As the solvent, a solvent dissolving the water-soluble resin is preferable. Thus, the fluidity of the three-dimension formation composition 1' can become better, and thus it is possible to more effectively prevent the involuntary variation in the thickness of the layer 1 which is formed using the three-dimension formation composition 1'. In addition, when the layer 1 is formed in a state in which the solvent was removed, it is possible to adhere the water-soluble resin to the particles with higher uniformity over the entire layer 1, and thus it is possible to more effectively prevent involuntary composition unevenness from occurring. Therefore, it is possible to more effectively prevent the occurrence of involuntary variation in mechanical strength at each site of the finally obtained three-dimensional structure 100, and it is possible to further increase the reliability of the three-dimensional structure 100.

Examples of the solvent constituting the three-dimension formation composition 1' include water; alcoholic solvents, such as methanol, ethanol, and isopropanol; ketone-based solvents, such as methyl ethyl ketone and acetone; glycol ether-based solvents, such as ethylene glycol monoethyl ether and ethylene glycol monobutyl ether; glycol ether acetate-based solvents, such as propylene glycol 1-monomethyl ether 2-acetate and propylene glycol 1-monomethyl ether 2-acetate; polyethylene glycol; and polypropylene glycol. They can be used alone or in a combination of two or more selected therefrom.

Preferably, the three-dimension formation composition 1' contains water. Therefore, the water-soluble resin can be more reliably dissolved, and thus the fluidity of the three-dimension formation composition 1' or the composition uniformity of the layer 1 formed using the three-dimension formation composition 1' can be made particularly excellent. Further, water is easily removed after the formation of the layer 1, and does not negatively influence the three-dimension formation composition 1' even when it remains in the three-dimensional structure 100. Moreover, water is advantageous in terms of safety for the human body and environmental issues.

When the three-dimension formation composition 1' contains a solvent, the content ratio of the solvent in the three-dimension formation composition 1' is preferably 5 mass % to 85 mass %, and more preferably 20 mass % to 80 mass %. Thus, the aforementioned effects due to containing the solvent can be more remarkably exhibited, and, in the process of manufacturing the three-dimensional structure 100, the solvent can be easily removed in a short time, and thus it is advantageous in terms of improvement in productivity of the three-dimensional structure 100.

In particular, when the three-dimension formation composition 1' contains water as the solvent, the content ratio of water in the three-dimension formation composition 1' is preferably 20 mass % to 85 mass %, and more preferably 20 mass % to 80 mass %. Thus, the aforementioned effects are more remarkably exhibited.

Other Components

The three-dimension formation composition 1' may contain components other than the aforementioned components. Examples of these components include a polymerization initiator, a polymerization accelerator, a penetration enhancer, a wetting agent (humectant), a fixing agent, a fungicide, a preservative, an antioxidant, a chelating agent, and a pH adjuster.

3. Binding Solution

Next, the binding solution used in manufacturing the three-dimensional structure of the invention will be described in detail.

The binding solution 2 contains at least a binder and a light stabilizer B.

Binder

The binder is a component having a function of binding the particles together by curing.

The binder is not particularly limited, but it is preferable that a binder having hydrophobicity (lipophilicity) is used. Thus, when hydrophobically-treated particles are used, affinity between the binding solution and the particles can be further increased, and the binding solution can suitably penetrate into the pores of the particles when the binding solution is applied to the layer 1. As a result, anchor effects due to the binder are appropriately exhibited, and thus it is possible to make the mechanical strength of the finally obtained three-dimensional structure excellent. Further, when the biding solution having hydrophobicity (lipophilicity) is used, it is possible to improve the water resistance of the three-dimensional structure. Further, in the invention, the hydrophobic curable resin may have sufficiently low affinity to water, but, for example, it is preferable that the solubility of the hydrophobic curable resin in water at 25° C. is 1 g/100 g water or less.

Examples of the binder include thermoplastic resins; thermosetting resins; various photocurable resins, such as a visible light curable resin, an ultraviolet curable resin, and an infrared curable resin; and X-ray curable resins. They can be used alone or in a combination of two or more thereof. From the view points of mechanical strength of the obtained three-dimensional structure and productivity of this three-dimensional structure, it is preferable that a curable resin is used as the binder. Further, among the various curable resins, from the viewpoints of mechanical strength of the obtained three-dimensional structure, productivity of this three-dimensional structure, storage stability of the binding solution, and treatability under a visible light environment, it is particularly preferable that an ultraviolet-curable resin (polymerizable compound) is used as the binder.

As the ultraviolet-curable resin (polymerizable compound), an ultraviolet-curable resin, by which addition polymerization or ring-opening polymerization is initiated by radical species or cationic species resulting from a photopolymerization initiator using ultraviolet irradiation to prepare a polymer, is preferably used. The types of addition polymerization include radical polymerization, cationic polymerization, anionic polymerization, metathesis, and coordination polymerization. The types of ring-opening polymerization include cationic polymerization, anionic polymerization, radical polymerization, metathesis, and coordination polymerization.

As the addition-polymerizable compound, there is exemplified a compound having at least one ethylenically-unsaturated double bond. As the addition-polymerizable compound, a compound having at least one terminal ethylenically-unsaturated bond, and preferably two or more terminal ethylenically-unsaturated bonds can be preferably used.

An ethylenically-unsaturated polymerizable compound has a chemical form of a monofunctional polymerizable compound, a polyfunctional polymerizable compound, or a mixture thereof. Examples of the monofunctional polymerizable compound include unsaturated carboxylic acids (for example, acrylic acid, methacrylic acid, itaconic acid, crotonic acid, isocrotonic acid, and maleic acid), esters thereof, and amides thereof. Examples of the polyfunctional polymerizable compound include esters of unsaturated carboxylic acids and aliphatic polyol compounds, and amides of unsaturated carboxylic acids and aliphatic polyvalent amine compounds.

Further, addition reaction products of unsaturated carboxylic esters or amides having a nucleophilic substituent, such as a hydroxyl group, an amino group, or a mercapto group, with isocyantes or epoxies; and dehydration condensation reaction products of such unsaturated carboxylic esters or amides with carboxylic acids can also be used. Moreover, addition reaction products of unsaturated carboxylic esters or amides having an electrophilic substituent, such as an isocyanate group or an epoxy group, with alcohols, amines and thiols; and substitution reaction products of unsaturated carboxylic esters or amides having a leaving group, such as a halogen group or a tosyloxy group, with alcohols, amines and thiols can also be used.

Typical examples of radical polymerizable compounds, which are esters of unsaturated carboxylic acids and aliphatic polyol compounds, include (meth)acrylic acid esters. Among these (meth)acrylic acid esters, any one of monofunctional (meth)acrylic acid esters and polyfunctional (meth)acrylic acid esters can also be used.

Specific examples of monofunctional (meth)acrylates include tolyloxyethyl(meth)acrylate, phenyloxyethyl(meth)acrylate, cyclohexyl(meth)acrylate, ethyl(meth)acrylate, methyl(meth)acrylate, isobornyl(meth)acrylate, tetrahydrofurfuryl(meth)acrylate, and 4-hydroxybutyl(meth)acrylate.

Specific examples of difunctional (meth)acrylates include ethylene glycol di(meth)acrylate, triethylene glycol di(meth)acrylate, 1,3-butanediol di(meth)acrylate, tetramethylene glycol di(meth)acrylate, propylene glycol di(meth)acrylate, neopentyl glycol di(meth)acrylate, hexanediol di(meth)acrylate, 1,4-cyclohexanediol di(meth)acrylate, tetraethylene glycol di(meth)acrylate, pentaerythritol di(meth)acrylate, dipentaerythritol di(meth)acrylate, 2-(2-vinyloxyethoxy)ethyl(meth)acrylate, dipropylene glycol diacrylate, and tripropylene glycol diacrylate.

Specific examples of trifunctional (meth)acrylates include trimethylolpropane tri(meth)acrylate, trimethylolethane tri(meth)acrylate, alkylene oxide-modified tri(meth)acrylate of trimethylolpropane, pentaerythritol tri(meth)acrylate, dipentaerythritol tri(meth)acrylate, trimethylolpropane tri((meth)acryloyloxypropyl) ether, isocyanuric acid alkylene oxide-modified tri(meth)acrylate, propionic acid dipentaerythritol tri(meth)acrylate, tri((meth)acryloyloxyethyl)isocyanurate, hydroxypivalaldehyde-modified dimethylolpropane tri(meth)acrylate, and sorbitol tri(meth)acrylate.

Specific examples of tetrafunctional (meth) acrylates include pentaerythritol tetra(meth)acrylate, sorbitol tetra(meth)acrylate, ditrimethylolpropane tetra(meth)acrylate, propionic acid dipentaerythritol tetra(meth)acrylate, and ethoxylated pentaerythritol tetra(meth)acrylate.

Specific examples of pentafunctional (meth)acrylates include sorbitol penta(meth)acrylate and dipentaerythritol penta(meth)acrylate.

Specific examples of hexafunctional (meth)acrylates include dipentaerythritol hexa(meth)acrylate, sorbitol hexa (meth)acrylate, alkylene oxide-modified hexa(meth)acrylate of phosphazene, and caprolactone-modified dipentaerythritol hexa(meth)acrylate.

Examples of polymerizable compounds other than (meth) acrylates include itaconic acid esters, crotonic acid esters, isocrotonic acid esters, and maleic acid esters.

Examples of itaconic acid esters include ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate.

Examples of crotonic acid esters include ethylene glycol dicrotonate, tetramethylene glycol dicrotonate, pentaerythritol dicrotonate, and sorbitol tetra-dicrotonate.

Examples of isocrotonic acid esters include ethylene glycol isocrotonate, pentaerythritol isocrotonate, and sorbitol tetra-isocrotonate.

Examples of maleic acid esters include ethylene glycol dimaleate, triethylene glycol dimaleate, pentaerythritol dimaleate, and sorbitol tetramaleate.

Examples of other esters include aliphatic alcohol-based esters disclosed in JP-B-46-27926, JP-B-51-47334, and JP-A-57-196231; esters having an aromatic skeleton disclosed in JP-A-59-5240, JP-A-59-5241, and JP-A-2-226149; and esters having an amino group disclosed in JP-A-1-165613.

Specific examples of monomers of amides of unsaturated carboxylic acids and aliphatic polyvalent amine compounds include methylene bis-acrylamide, methylene bis-methacrylamide, 1,6-hexamethylene bis-acrylamide, 1,6-hexamethylene bis-methacrylamide, diethylenetriamine tris-acrylamide, xylylene bisacrylamide, and xylylene bismethacrylamide.

Preferable examples of other amide-based monomers include amide-based monomers having a cyclohexylene structure disclosed in JP-B-54-21726.

Further, a urethane-based addition-polymerizable compound prepared using the addition reaction of isocyanate and a hydroxyl group is also preferable. As a specific example thereof, there is exemplified a vinyl urethane compound (disclosed in JP-B-48-41708) containing two or more polymerizable vinyl groups in one molecule, which is prepared by adding a vinyl monomer (represented by Formula (1) below) containing a hydroxyl group to a polyisocyanate compound having two or more isocyanate groups in one molecule.

$$CH^2=C(R^1)COOCH_2CH(R^2)OH \quad (1)$$

(In the formula (1), $R^1$ and $R^2$ each independently represent H or $CH^3$.)

In the invention, a cationic ring-opening polymerizable compound having at least one cyclic ether group such as an epoxy group or an oxetane group in a molecule can be suitably used as an ultraviolet-curable resin (polymerizable compound).

Examples of the cationic polymerizable compound include curable compounds containing a ring-opening polymerizable group. Among these, a curable compound containing a heterocyclic group is preferable. Preferable examples of such curable compounds include epoxy derivatives, oxetane derivatives, tetrahydrofuran derivatives, cyclic lactone derivatives, cyclic carbonate derivatives, cyclic imino ethers such as oxazoline derivatives, and vinyl ethers. Among them, epoxy derivatives, oxetane derivatives, and vinyl ethers are preferable.

Examples of preferable epoxy derivatives include monofunctional glycidyl ethers, polyfunctional glycidyl ethers, monofunctional alicyclic epoxies, and polyfunctional alicyclic epoxies.

Examples of specific compounds of glycidyl ethers include diglycidyl ethers (for example, ethylene glycol diglycidyl ether, bisphenol A diglycidyl ether, and the like), tri- or more functional glycidyl ethers (for example, trimethylolethane triglycidyl ether, trimethylolpropane triglycidyl ether, glycerol triglycidyl ether, triglycidyl tris-hydroxyethyl isocyanurate, and the like), tetra- or more functional glycidyl ethers (for example, sorbitol tetraglycidyl ether, pentaerythritol tetraglycidyl ether, polyglycidyl ethers of cresol novolac resins, polyglycidyl ethers of phenolic novolac resin, and the like), alicyclic epoxies (for example, CELLOXIDE 2021P, CELLOXIDE 2081, EPO-LEAD GT-301, EPOLEAD GT-401 (all are manufactured by Daicel Chemical Industries Co., Ltd.), EHPE (manufactured by Daicel Chemical Industries, Ltd.), polycyclohexyl methyl ethers of phenol novolac resins, and the like), and oxetanes (for example, OX-SQ, PNOX-1009 (all are manufactured by Toagosei Co., Ltd.), and the like).

As the polymerizable compound, an alicyclic epoxy derivative can be preferably used. The "alicyclic epoxy group" refers to a partial structure in which a double bond of a ring of a cycloalkene group such as a cyclopentene group or a cyclohexene group is epoxidized with a suitable oxidant such as hydrogen peroxide or peracid.

As the alicyclic epoxy compound, polyfunctional alicyclic epoxy compounds having two or more cyclohexene oxide groups or cyclopentene oxide groups in one molecule are preferable. Specific examples of the alicyclic epoxy compound include 4-vinylcyclohexene dioxide, (3,4-epoxycyclohexyl)methyl-3,4-epoxycyclohexyl carboxylate, di-(3,4-epoxycyclohexyl) adipate, di-(3,4-epoxycyclohexylmethyl) adipate, bis-(2,3-epoxy cyclopentyl) ether, di-(2,3-epoxy-6-methylcyclohexyl methyl) adipate, and dicyclopentadiene dioxide.

A general glycidyl compound having an epoxy group, which does not have an alicyclic structure in a molecule, can be used alone or in combination with the above alicyclic epoxy compound.

Examples of the general glycidyl compound include glycidyl ether compounds and glycidyl ester compounds. It is preferable to use glycidyl ether compounds.

Specific examples of glycidyl ether compounds include: aromatic glycidyl ether compounds, such as 1,3-bis(2,3-epoxypropyloxy)benzene, bisphenol A type epoxy resins, bisphenol F type epoxy resins, phenol•novolac type epoxy resins, cresol•novolak type epoxy resins, and trisphenol-methane type epoxy resin; and aliphatic glycidyl ether compounds, such as 1,4-butanediol glycidyl ether, glycerol triglycidyl ether, propylene glycol diglycidyl ether, and trimethylolpropane triglycidyl ether. Examples of glycidyl esters may include glycidyl esters of a linoleic acid dimer.

As the polymerizable compound, a compound having an oxetanyl group which is a cyclic ether of a four-membered ring (hereinafter, simply referred to as "oxetane compound") can be used. The oxetanyl group-containing compound is a compound having one or more oxetanyl groups in one molecule.

The content ratio of the binder in the binding solution is preferably 80 mass % or more, and more preferably 85 mass % or more. In this case, it is possible to make the mechanical strength of the finally obtained three-dimensional structure particularly excellent.

Light Stabilizer B

The binding solution 2 contains a light stabilizer B.

As the light stabilizer B, a light stabilizer the same as that described in the section of the light stabilizer A can be used.

As is the case with the light stabilizer A, it preferable that the light stabilizer B contains at least one of a hindered amine-based stabilizer and a triazine-based stabilizer, and it is more preferable that the light stabilizer B contains both a hindered amine-based stabilizer and a triazine-based stabilizer. Thus, it is possible to further improve the stability to light of the finally obtained three-dimensional structure 100.

The content ratio of the light stabilizer B in the binding solution 2 is preferably 0.01 mass % to 0.35 mass %, and more preferably 0.01 mass % to 0.25 mass %. Thus, it is possible to further improve the stability to light of the finally obtained three-dimensional structure 100 while maintaining the ejection stability and storage stability of the binding solution 2. In contrast, when the content ratio of the light stabilizer B is less than the lower limit, it is necessary to increase the content ratio of the light stabilizer A, which is added to the three-dimension formation composition 1' in order to improve the light stability of the three-dimensional structure 100, and thus there is a case in which ejection stability of the three-dimension formation composition 1' is lowered. Meanwhile, when the content ratio of the light stabilizer B is more than the upper limit, there is a case in which the ejection stability and storage stability of the binding solution 2 are lowered.

Other Components

The binding solution 2 may contain other components in addition to the above-mentioned components. Examples of these components include various colorants such as pigments and dyes; dispersants; surfactants; polymerization initiators; polymerization accelerators; solvents; penetration enhancers; wetting agents (humectants); fixing agents; antifungal agents; preservatives; antioxidants; chelating agents; pH adjusting agents; thickeners; fillers; aggregation inhibitors; and defoamers.

Particularly, when the binding solution 2 contains the colorant, it is possible to obtain a three-dimensional structure 100 colored in a color corresponding to the color of the colorant.

Particularly, when the binding solution 2 contains pigment as the colorant, it is possible to make the light resistance of the binding solution 2 or the three-dimensional structure 100 good. As the pigment, both inorganic pigments and organic pigments can be used.

Examples of inorganic pigments include carbon blacks (C. I. Pigment Black 7) such as furnace black, lamp black, acetylene black, and channel black; iron oxide; titanium oxide; calcium carbonate; barium sulfate; micronized silicic acid; silica; calcium silicate; alumina; zinc oxide; cerium oxide; talc; and clay. They can be used alone or in a combination of two or more selected therefrom.

Among these inorganic pigments, in order to exhibit preferable white color and sedimentation recovery properties, titanium oxide is preferable.

Examples of organic pigments include azo pigments such as insoluble azo pigments, condensed azo pigments, azo lakes, and chelate azo pigments; polycyclic pigments such as phthalocyanine pigments, perylene and perinone pigments, anthraquinone pigments, quinacridone pigments, dioxane pigments, thioindigo pigments, isoindolinone pigments, quinophthalone pigments; dye chelates (for example, basic dye chelates, acidic dye chelates, and the like); staining lakes (basic dye lakes, acidic dye lakes); nitro pigments; nitroso pigments; aniline blacks; and daylight fluorescent pigments. They can be used alone or in a combination of two or more selected therefrom.

More specifically, examples of carbon black used as black pigment include No. 2300, No. 900, MCF88, No. 33, No. 40, No. 45, No. 52, MA7, MA8, MA100, and No. 2200B (all are manufactured by Mitsubishi Chemical Corporation); RAVEN 5750, RAVEN 5250, RAVEN 5000, RAVEN 3500, RAVEN 1255, and RAVEN 700 (all are manufactured by Carbon Columbia Co., Ltd.); REGAL 400R, REGAL 330R, REGAL 660R, MOGUL L, MONARCH 700, MONARCH 800, MONARCH 880, MONARCH 900, MONARCH 1000, MONARCH 1100, MONARCH 1300, and MONARCH 1400 (all are manufactured by CABOT JAPAN K.K.); and COLOR BLACK FW1, COLOR BLACK FW2, COLOR BLACK FW2V, COLOR BLACK FW18, COLOR BLACK FW200, COLOR BLACK S150, COLOR BLACK S160, COLOR BLACK S170, PRINTEX 35, PRINTEX U, PRINTEX V, PRINTEX 140U, SPECIAL BLACK 6, SPECIAL BLACK 5, SPECIAL BLACK 4A, and SPECIAL BLACK 4 (all are manufactured by Degussa Co., Ltd.).

Examples of white pigment include C. I. Pigment Whites 6, 18, and 21.

Examples of yellow pigment include C. I. Pigment Yellows 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 150, 151, 153, 154, 155, 167, 172, and 180.

Examples of magenta pigment include C. I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57: 1, 88, 112, 114, 122, 123, 144, 146, 149, 150, 166, 168, 170, 171, 175, 176, 177, 178, 179, 184, 185, 187, 202, 209, 219, 224, and 245; and C. I. Pigment Violets 19, 23, 32, 33, 36, 38, 43, and 50.

Examples of cyan pigment include C. I. Pigment Blues 1, 2, 3, 15, 15:1, 15:2, 15:3, 15:34, 15:4, 16, 18, 22, 25, 60, 65, and 66; and C. I. Bat Blue 4 and 60.

Examples of pigments other than the above pigments include C. I. Pigment Greens 7 and 10; C. I. Pigment Browns 3, 5, 25, and 26; C. I. Pigment Oranges 1, 2, 5, 7, 13, 14, 15, 16, 24, 34, 36, 38, 40, 43, and 63.

When the binding solution 2 contains a pigment, the average particle diameter of the pigment is preferably 300 nm or less, and more preferably 50 nm to 250 nm. Thus, the ejection stability of the binding solution 2 and the dispersion stability of the pigment in the binding solution 2 can be particularly excellent, and images with better image quality can be formed.

In the case where the binding solution 2 contains the pigment, when the average hole diameter of the particles is expressed by d1 [nm] and the average particle diameter of the pigment is expressed by d2 [nm], preferably, the relationship of $d1/d2>1$ is satisfied, and, more preferably, the relationship of $1.1 \leq d1/d2 \leq 6$ is satisfied. When this relationship is satisfied, the pigment can be suitably retained in the holes of the particles. Therefore, the involuntary scattering of the pigment can be prevented, and thus it is possible to reliably form an image with high definition.

Examples of dyes include acid dyes, direct dyes, reactive dyes, and basic dyes. They can be used alone or in a combination of two or more thereof.

Specific examples of dyes include C. I. Acid Yellow 17, 23, 42, 44, 79, and 142; C. I. Acid Red 52, 80, 82, 249, 254, and 289; C. I. Acid Blue 9, 45, and 249; C. I. Acid Black 1, 2, 24, and 94; C. I. Food Black 1, and 2; C. I. Direct Yellow 1, 12, 24, 33, 50, 55, 58, 86, 132, 142, 144, and 173; C. I. Direct Red 1, 4, 9, 80, 81, 225, and 227; C. I. Direct Blue 1, 2, 15, 71, 86, 87, 98, 165, 199, and 202; C. I. Direct black 19, 38, 51, 71, 154, 168, 171, and 195; C. I. Reactive Red 14, 32, 55, 79, and 249; and C. I. Reactive Black 3, 4, and 35.

When the binding solution 2 contains a colorant, the content ratio of the colorant in the binding solution 2 is preferably 1 mass % to 30 mass %. Thus, particularly excellent hiding properties and color reproducibility are obtained.

Particularly, when the binding solution 2 contains titanium oxide as the colorant, the content ratio of titanium oxide in the binding solution 2 is preferably 5 mass % to 25 mass %, and more preferably 7 mass % to 20 mass %. Thus, particularly excellent hiding properties and sedimentation recovery properties are obtained.

When the binding solution 2 contains a dispersant in addition to a pigment, the dispersibility of the pigment can be further improved. As a result, it is possible to more effectively suppress the partial reduction in mechanical strength due to the bias of the pigment.

The dispersant is not particularly limited, but examples thereof include dispersants, such as a polymer dispersant, generally used in preparing a pigment dispersion liquid. Specific examples of the polymer dispersants include polymer dispersants containing one or more of polyoxyalkylene polyalkylene polyamine, vinyl polymers and copolymers, acrylic polymers and copolymers, polyesters, polyamides, polyimides, polyurethanes, amino-based polymers, silicon-containing polymers, sulfur-containing polymers, fluorinated polymers, and epoxy resins, as main components thereof. Examples of commercially available products of polymer dispersants include AJISPER series of Ajinomoto Fine-techno Co., Inc.; SOLSPERSE series (SOLSPERSE 36000 and the like) commercially available from Lubrizol Corporation; DISPERBYK series of BYK Japan K.K.; and DISPARLON series of Kusumoto Chemicals, Ltd.

When the binding solution 2 contains a surfactant, the penetrability into the layer and the abrasion resistance of the three-dimensional structure 100 can be improved. The surfactant is not particularly limited, but examples thereof include silicone-based surfactants such as polyester-modified silicone, and polyether-modified silicone. Among these, polyether-modified polydimethylsiloxane or polyester-modified polydimethylsiloxane is preferably used. Specific examples of the surfactant include BYK-347, BYK-348, BYK-349, BYK-UV 3500, BYK-UV 3510, BYK-UV 3530, and BYK-UV 3570 (all are trade names of BYK Japan K.K.).

The binding solution 2 may contain a solvent. Thus, the viscosity of the binding solution 2 can be suitably adjusted, and the ejection stability of the binding solution 2 using an ink jet method can be particularly excellent even when the binding solution 2 contains a component having high viscosity.

Examples of the solvent include (poly)alkylene glycol monoalkyl ethers, such as ethylene glycol monomethyl ether, ethylene glycol monoethyl ether, propylene glycol monomethyl ether, and propylene glycol monoethyl ether; acetic acid esters, such as ethyl acetate, n-propyl acetate, iso-propyl acetate, n-butyl acetate, and iso-butyl acetate; aromatic hydrocarbons, such as benzene, toluene, and xylene; ketones, such as methyl ethyl ketone, acetone, methyl isobutyl ketone, ethyl-n-butyl ketone, diisopropyl ketone, and acetylacetone; alcohols, such as ethanol, propanol, and butanol. They can be used alone or in a combination of two or more thereof.

The viscosity of the binding solution 2 is preferably 5 mPa·s to 25 mPa·s, and more preferably 7 mPa·s to 15 mPa·s. Thus, the discharge stability of ink by an ink jet method can be particularly excellent. In the present specification, viscosity refers to a value measured at 20° C. using a rheometer (product name: MCR-300, manufactured by Physica Inc.).

Meanwhile, in the manufacture of the three-dimensional structure 100, a plurality of kinds of binding solutions 2 may be used.

For example, a binding solution 2 (color ink) containing a colorant and a binding solution 2 (clear ink) containing no colorant may be used. Thus, for example, for improving the appearance of the three-dimensional structure 100, the binding solution 2 containing a colorant may be used as a binding solution 2 applied to the region influencing color tone, and, for improving the appearance of the three-dimensional structure 100, the binding solution 2 containing no colorant may be used as a binding solution 2 applied to the region not influencing color tone. Further, in the finally obtained three-dimensional structure 100, a plurality of kinds of binding solutions 2 may be used in combination with each other such that the region (coating layer) formed using the binding solution 2 containing no colorant is provided on the outer surface of the region formed using the binding solution 2 containing a colorant.

For example, a plurality of kinds of binding solutions 2 containing colorants having different compositions from each other may be used. Thus, a wider color reproducing area can be expressed and can be realized by the combination of these binding solutions 2.

When the plurality of kinds of binding solutions 2 are used, it is preferable that at least a cyan binding solution 2, a magenta binding solution 2, and a yellow binding solution 2 are used. Thus, a wider color reproducing area that can be expressed can be realized by the combination of these binding solutions 2.

Further, for example, the following effects are obtained by the combination of a white binding solution 2 and another colored binding solution 2. That is, the finally obtained three-dimensional structure 100 can have a first area on which a white binding solution 2 is applied, and a second area which overlaps with the first area and is provided outside the first area and on which a binding solution 2 having a color other than white color is applied. Thus, the first area on which a white binding solution 2 is applied can exhibit hiding properties, and the color saturation of the three-dimensional structure 100 can be enhanced.

4. Three-Dimensional Structure

The three-dimensional structure of the invention can be manufactured using the above-mentioned method. Thus, it is possible to provide a three-dimensional structure having excellent stability to light.

Applications of the three-dimensional structure of the invention are not particularly limited, but examples thereof include appreciated and exhibited objects such as dolls and figures; and medical instruments such as implants; and the like.

In addition, the three-dimensional structure of the invention may be applied to prototypes, mass-produced products, made-to-order goods, and the like.

Although preferred embodiments of the invention have been described, the invention is not limited thereto.

More specifically, for example, it has been described in the aforementioned embodiment that, in addition to the layer forming process and the discharge process, the curing process is also repeated in conjunction with the layer forming process and the discharge process. However, the curing process may not be repeated. For example, the curing process may be carried out completely after forming a laminate having a plurality of layers that are not cured.

In the method of manufacturing a three-dimensional structure according to the invention, if necessary, a pre-treatment process, an intermediate treatment process, or a post-treatment process may be carried out.

As an example of the pre-treatment process, a process of cleaning a support (stage) is exemplified.

As the intermediate treatment process, for example, when the three-dimension formation composition contains a solvent component (dispersion medium) such as water, a process of removing the solvent component may be carried out between the layer forming process and the discharge process. Thus, the layer forming process can be more smoothly performed, and the involuntary variation in the thickness of the formed layer can be more effectively prevented. As a result, it is possible to manufacture a three-dimensional structure having higher dimensional accuracy and higher productivity.

Examples of the post-treatment process include a cleaning process, a shape adjusting process of performing deburring or the like, a coloring process, a process of forming a covering layer, and an ultraviolet curable resin curing completion process of performing light irradiation treatment or heat treatment for reliably curing an uncured ultraviolet curable resin.

Further, it has been described in the aforementioned embodiment that a binding solution is applied to all of the layers. However, a layer on which the binding solution is not applied may exist. For example, the binding solution may not be applied to the layer formed directly on a support (stage), thus allowing this layer to function as a sacrificial layer.

Moreover, in the aforementioned embodiment, the case of performing the discharge process using an ink jet method has been mainly described. However, the discharge process may be performed using other methods (for example, other printing methods).

EXAMPLES

Hereinafter, the invention will be described in more detail with reference to the following specific Examples, but the invention is not limited to these Examples. In the following description, particularly, it is assumed that treatment showing no temperature condition is performed at room temperature (25° C.). Further, in the case where a temperature is not shown even in various measurement conditions, it is assumed that the measured values are values measured at room temperature (25° C.)

[1] Manufacture of Three-Dimensional Structure

Example 1

1. Preparation of Three-Dimension Formation Composition

First, powder composed of silica particles (trade name "FB5D", manufactured by Denki Industrial Chemicals, Ltd.) was prepared.

Next, 65.5 mass % of the powder; 30.33 mass % of a polyacrylic acid-based polymer (trade name "AS1100", manufactured by Toagosei Co., Ltd., solid content concentration: 30 mass %) as a water-soluble resin; 2.5 mass % of a triazine-based stabilizer (trade name "TINUVIN 479DW", manufactured by BASF Corporation, solid content concentration: 20 mass %) and 1.67 mass % of a hindered amine-based stabilizer (trade name "TINUVIN 123DW", manufactured by BASF Corporation, solid content concentration: 30 mass %), as a light stabilizer A; and 0.5 mass % of a phenol-based antioxidant (trade name "IRGANOX 1520L", manufactured by BASF Corporation), were mixed to obtain a three-dimension formation composition.

2. Manufacture of Three-Dimensional Structure

Figure 3:
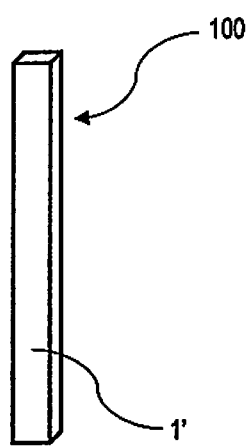
FIG. 3 is a perspective view showing a shape of a three-dimensional structure manufactured in each of Examples and Comparative Examples.

The three-dimensional structure having a shape shown in FIG. 3, that is, having a cubic shape of 4 mm (thickness)×10 mm (width)×90 mm (length) was manufactured using the obtained three-dimension formation composition as follows.

First, a three dimension forming apparatus was prepared, and a layer (thickness: 50 μm) was formed on the surface of a support (stage) using the three-dimension formation composition and a squeegee method (layer forming process).

Next, the formed layer was left at room temperature for 5 minutes, thereby removing water contained in the three-dimension formation composition.

Next, a binding solution was applied to the layer made of the three-dimension formation composition in a predetermined pattern using an ink jet method (ink discharge process). As the binding solution, a binding solution having the following composition and a viscosity of 15 mPa·s at 25° C. was used.

Binder
Mono Functional Monomer
Penoxyethyl acrylate (trade name "V#192", manufactured by Osaka Organic Chemical Industry Ltd.): 10 mass %
4-hydroxybutyl acrylate (trade name "4HBA", manufactured by Osaka Organic Chemical Industry Ltd.): 30 mass %
Difunctional Monomer
2-(2-vinyloxyethoxy)ethyl acrylate (product name "VERA", manufactured by Nippon Shokubai Co., Ltd.,): 35 mass %
Tricyclodecanedimethylol diacrylate (trade name "KAYARAD R-684", manufactured by Nippon Kayaku Co., Ltd.,): 15 mass %
Hexafunctional Monomer
Dipentaerythritol hexaacrylate (trade name "A-DPH", manufactured by Shin-Nakamura Chemical Co., Ltd.,): 1.25 mass %
Polymerization Initiator
Bis(2,4,6-trimethylbenzoyl)-phenylphosphine oxide (trade name "IRGACURE 819", manufactured by BASF Corporation): 4 mass %
2,4,6-trimethylbenzoyl-diphenylphosphine oxide (trade name "LUCIRIN TPO", manufactured by BASF Corporation): 4 mass %
Fluorescent Whitening Agent (Sensitizer)
1,4-bis-(2-benzoxazolyl) naphthalene (product name "HOSTALUX KCB", manufactured by Clariant GmbH Co., Ltd.): 0.25 mass %
Surfactant
Silicone-based surfactant (trade name "BYK3500", manufactured by BYK Co., Ltd.): 0.2 mass %
Light Stabilizer B
Triazine-based stabilizer (trade name "TINUVIN 479", manufactured by BASF Corporation): 0.15 mass %
Hindered amine-based stabilizer (trade name "TINUVIN 123", manufactured by BASF Corporation): 0.15 mass %

Next, the layer was irradiated with ultraviolet rays to cure the binder contained in the three-dimension formation composition (curing process).

Thereafter, a series of processes of the layer forming process to the curing process were repeated such that a plurality of layers are laminated while changing the pattern of the applied ink depending on the shape of the three-dimensional structure to be manufactured.

Thereafter, the laminate obtained in this way was dipped into water, and ultrasonic vibration was applied thereto to remove the particles not bound by the ultraviolet curable resin (unbound particles) from the particles constituting each of the layers, thereby obtaining the three-dimensional structure A and the three-dimensional structure B two by two, respectively.

Thereafter, a drying process was carried out at 60° C. for 60 minutes.

Examples 2 to 6 and Comparative Examples 1 to 3

Three-dimensional structures were respectively manufactured in the same manner as in Example 1, except that the configuration of each of the three-dimension formation compositions was changed as shown in Table 1 by changing the kinds of raw materials used in preparing the three-dimension formation composition and the composition ratio of each of the components, and except that the configuration of each of the binding solutions was changed as shown in Table 2 by changing the kinds of raw materials used in preparing the binding solution and the composition ratio of each of the components.

The configurations of the three-dimension structures of Examples and Comparative Examples are summarized in Table 1. In Table 1, silica is expressed by "$SiO_2$", acrylic resin (trade name "MBX-8", manufactured by Sekisui Plastics Co., Ltd.) is expressed by "PMMA", TINUVIN 479DW and TINUVIN 479 are respectively expressed by "479", and TINUVIN 123DW and TINUVIN 123 are respectively expressed by "123".

In Table 1, the content ratio of the light stabilizer A expresses the content ratio of the effective component (light stabilizer itself). Similarly, in Table 1, the content ratio of the water-soluble resin expresses the content ratio of the effective component (resin itself), and the content ratio of the solvent expresses the content ratio of water contained in the light stabilizer A and water contained in the water-soluble resin.

TABLE 1

Three-dimension formation composition

| | Particle | | Light stabilizer A | | | | Water-soluble resin | | Solvent |
| | Kind | Content ratio (mass %) | Kind | Content ratio (mass %) | Kind | Content ratio (mass %) | Total Content ratio A (mass %) | Content ratio (mass %) | Antioxidant Content ratio (mass %) | Content ratio (mass %) |
|---|---|---|---|---|---|---|---|---|---|---|
| Ex. 1 | $SiO_2$ | 65.5 | 479 | 0.5 | 123 | 0.5 | 1.0 | 9.1 | 0.5 | 23.9 |
| Ex. 2 | PMMA | 65.5 | 479 | 0.5 | 123 | 0.5 | 1.0 | 9.1 | 0.5 | 23.9 |
| Ex. 3 | $SiO_2$ | 65.5 | 479 | 0.4 | 123 | 0.4 | 0.8 | 9.1 | 0.5 | 24.1 |
| Ex. 4 | $SiO_2$ | 65.5 | 479 | 0.5 | 123 | 0.5 | 1.0 | 9.1 | 0.5 | 23.9 |
| Ex. 5 | $SiO_2$ | 65.5 | 479 | 0.3 | 123 | 0.3 | 0.6 | 9.1 | 0.5 | 24.3 |
| Ex. 6 | $SiO_2$ | 65.5 | 479 | 0.015 | 123 | 0.015 | 0.03 | 9.1 | 0.5 | 24.87 |
| Comp. Ex. 1 | $SiO_2$ | 65.5 | — | — | — | — | — | 9.1 | — | 25.4 |
| Comp. Ex. 2 | $SiO_2$ | 65.5 | — | — | — | — | — | 9.1 | — | 25.4 |
| Comp. Ex. 3 | $SiO_2$ | 65.5 | 479 | 0.005 | 123 | 0.005 | 0.01 | 9.1 | 0.5 | 24.89 |

TABLE 2

Binding solution

| | Binder Content ratio (mass %) | Light stabilizer B | | | | Total Content ratio B (mass %) | Polymerization initiator Content ratio (mass %) | Sensitizer Content ratio (mass %) | surfactant Content ratio (mass %) |
| | | Kind | Content ratio (mass %) | Kind | Content ratio (mass %) | | | | |
|---|---|---|---|---|---|---|---|---|---|
| Ex. 1 | 91.25 | 479 | 0.15 | 123 | 0.15 | 0.3 | 8.0 | 0.25 | 0.2 |
| Ex. 2 | 91.25 | 479 | 0.15 | 123 | 0.15 | 0.3 | 8.0 | 0.25 | 0.2 |
| Ex. 3 | 91.25 | 479 | 0.15 | 123 | 0.15 | 0.3 | 8.0 | 0.25 | 0.2 |
| Ex. 4 | 91.2 | 479 | 0.2 | 123 | 0.15 | 0.35 | 8.0 | 0.25 | 0.2 |
| Ex. 5 | 91.25 | 479 | 0.15 | 123 | 0.15 | 0.3 | 8.0 | 0.25 | 0.2 |
| Ex. 6 | 91.54 | 479 | 0.005 | 123 | 0.005 | 0.01 | 8.0 | 0.25 | 0.2 |
| Comp. Ex. 1 | 91.55 | — | — | — | — | — | 8.0 | 0.25 | 0.2 |
| Comp. Ex. 2 | 90.55 | 479 | 0.5 | 123 | 0.5 | 1.0 | 8.0 | 0.25 | 0.2 |
| Comp. Ex. 3 | 91.545 | 479 | 0.0025 | 123 | 0.0025 | 0.005 | 8.0 | 0.25 | 0.2 |

3. Evaluation 3.1. Evaluation of Ejection Reliability of Binding Solution (Evaluation of Clogging)

The binding solution of each of Examples and Comparative Examples was sealed in an ink pack, this ink pack was put into an ink cartridge, and this ink cartridge was mounted in the printer (PX-G5000, manufactured by Seiko Epson Corporation). Thereafter, the binding solution was continuously discharged from a head having 360 nozzles for 10 minutes. At this time, the temperature of the binding solution in the head was adjusted such that the viscosity of the binding solution was 10 mPa·s. After the discharge of the binding solution, the nozzles was checked to count the number of non-discharging nozzles. Based on the number of non-discharging nozzles, the ejection reliability of the binding solution was evaluated according to the following criteria.
A: The number of non-discharging nozzles was less than 2.
B: The number of non-discharging nozzles was 2 or more.
3.2. Viscosity Change of Binding Solution The binding solution of each of Examples and Comparative Examples was left for 7 days under an environment of an atmosphere temperature of 60° C., and the viscosity of the binding solution at 20° C. was measured using the viscometer (product name: MCR-300, manufactured by Physica Inc.). The viscosity change rate of the binding solution before and after being left was calculated based on the viscosity of the binding solution before being left, and the viscosity change of the binding solution was evaluated based on the following criteria. Here, shear rate was set to 200 s$^{-1}$ using a cone (diameter: 75 mm, angle: 1°).
AA: viscosity change was less than 5%.
A: viscosity change was equal to or more than 5% and less than 10%.
B: viscosity change was 10% or more.
3.3. Color Change of Three-Dimensional Structure The three-dimensional structure was left for 2 weeks under an environment of a light illuminance of 50 W/m$^2$, measured by the Xe fade meter (trade name "XL75", manufactured by Suga Test Instruments Co., Ltd.). The values of L*a*b* before and after being left were measured using the colorimeter "Spectrolino" (manufactured by Gretag Macbeth Co., Ltd.) to determine the change in the value (ΔE). Here, evaluation criteria are classified as follows. In this evaluation test, the result was determined to be good with a result of AA and A.
AA: ΔE was less than 3.0.
A: ΔE was equal to or more than 3.0 and less than 5.0.
B: ΔE was 5.0 or more.
3.4. Bending Strength The bending strength of each of the three-dimensional structures of Examples and Comparative Examples, immediately after the manufacture thereof, was measured under the conditions of a distance between supporting points of 64 mm and a testing speed of 2 mm/min based on JIS K 7171: 1994 (ISO 178: 1993). Further, the bending strength of each of the three-dimensional structures of Examples and Comparative Examples, having been left for 2 weeks under an environment of a light illuminance of 50 W/m$^2$ measured by the Xe fade meter (trade name "XL75", manufactured by Suga Test Instruments Co., Ltd.), was also measured in the same manner as described above. The bending strength thereof was evaluated based on the following criteria.
AA: bending strength was not changed.
A: bending strength was slightly changed.
B: bending strength was greatly changed.

These results are summarized in Table 3.

TABLE 3

|  | Clogging | Viscosity change | Color change | Bending strength |
|---|---|---|---|---|
| Ex. 1 | A | A | AA | AA |
| Ex. 2 | A | A | AA | AA |
| Ex. 3 | A | A | AA | AA |
| Ex. 4 | A | A | AA | AA |
| Ex. 5 | A | A | AA | AA |
| Ex. 6 | A | AA | A | A |
| Comp. Ex. 1 | A | AA | B | B |
| Comp. Ex. 2 | B | B | A | A |
| Comp. Ex. 3 | A | AA | B | B |

As apparent from Table 3, in the invention, three-dimensional structures having excellent stability to light could be efficiently manufactured. In contrast, in the three-dimensional structure of Comparative Example 1, the stability to light thereof was not sufficient. Further, in Comparative Example 2, clogging occurred at the time of discharging the binding solution, and thus the three-dimensional structure could not be efficiently manufactured.

The entire disclosure of Japanese Patent Application No. 2014-132335, filed Jun. 27, 2014 is expressly incorporated by reference herein.

What is claimed is:

1. A method of manufacturing a three-dimensional structure, in which the three-dimensional structure is manufactured by laminating a layer, the method comprising:
    forming the layer using a three-dimension formation composition containing a particle and a light stabilizer A; and
    discharging a binding solution containing a binder and a light stabilizer B to the layer,
    when the content ratio of the light stabilizer A contained in the three-dimension formation composition is represented by A (mass %) and the content ratio of the light stabilizer B contained in the binding solution being represented by B (mass %), a relationship of 2≤A/B≤4 is satisfied.

2. The method of manufacturing a three-dimensional structure according to claim 1,
    wherein the content ratio of the light stabilizer A in the three-dimension formation composition is 0.03 mass % to 1.0 mass %.

3. The method of manufacturing a three-dimensional structure according to claim 1,
    wherein the content ratio of the light stabilizer B in the binding solution is 0.01 mass % to 0.35 mass %.

4. The method of manufacturing a three-dimensional structure according to claim 1,
    wherein each of the light stabilizer A and the light stabilizer B contains at least one of a hindered amine-based stabilizer and a triazine-based stabilizer.

5. The method of manufacturing a three-dimensional structure according to claim 1,
    wherein the three-dimension formation composition contains a water-soluble resin.

6. A three-dimensional structure, which is manufactured by the method of manufacturing a three-dimensional structure according to claim 1.

7. A three-dimensional structure, which is manufactured by the method of manufacturing a three-dimensional structure according to claim 2.

8. A three-dimensional structure, which is manufactured by the method of manufacturing a three-dimensional structure according to claim 3.

9. A three-dimensional structure, which is manufactured by the method of manufacturing a three-dimensional structure according to claim 4.

10. A three-dimensional structure, which is manufactured by the method of manufacturing a three-dimensional structure according to claim 5.

* * * * *